United States Patent [19]

Nakamura et al.

[11] 4,303,870

[45] Dec. 1, 1981

[54] POWER SUPPLY SYSTEM FOR LINEAR MOTOR

[75] Inventors: Kiyoshi Nakamura, Katsuta; Masayoshi Isaka, Hitachi; Yoshimi Kurotaki, Katsuta; Yutaka Suzuki, Hitachi, all of Japan

[73] Assignee: Hitachi, Ltd., Tokyo, Japan

[21] Appl. No.: 64,361

[22] Filed: Aug. 7, 1979

[30] Foreign Application Priority Data

Aug. 12, 1978 [JP] Japan .................... 53-97793

[51] Int. Cl.³ ........................................... H02K 41/00
[52] U.S. Cl. .................................. 318/135; 104/290; 104/292; 104/294; 310/12
[58] Field of Search ..................... 104/290, 293, 294; 318/135, 929, 438; 323/119, 128; 310/12, 13

[56] References Cited

U.S. PATENT DOCUMENTS

| | | | |
|---|---|---|---|
| 3,703,680 | 11/1972 | Frank et al. | 323/128 |
| 3,736,880 | 6/1973 | Ross | 318/135 X |
| 3,754,184 | 8/1973 | Stone | 323/128 |
| 3,827,371 | 8/1974 | Onoda | 318/135 X |
| 3,904,942 | 9/1975 | Holtz | 318/135 |
| 4,013,014 | 3/1977 | Holtz | 318/135 X |
| 4,055,795 | 10/1977 | Mathieu | 323/128 X |
| 4,068,152 | 1/1978 | Nakamura et al. | 318/135 |
| 4,101,821 | 7/1978 | Kirby | 323/128 X |

Primary Examiner—Donovan F. Duggan
Attorney, Agent, or Firm—Craig and Antonelli

[57] ABSTRACT

A power supply system for a linear motor comprising a plurality of driving coils disposed along the track for a running body for generating a shifting magnetic field to drive the running body, power converter means for feeding the plurality of driving coils with electrical energy, a plurality of switches responsive to the movement of the running body for selectively electrically connecting each of the driving coils to the power converter means, a first reactive power controller continuously electrically connected to the power input side of the power converter means, and a second reactive power controller selectively electrically connected to the power input side of the power converter means in accordance with the movement of the running body, whereby the steady reactive-power is compensated for by the first reactive power controller and the reactive power which varies with the movement of the running body is compensated for by the second reactive power controller.

2 Claims, 7 Drawing Figures

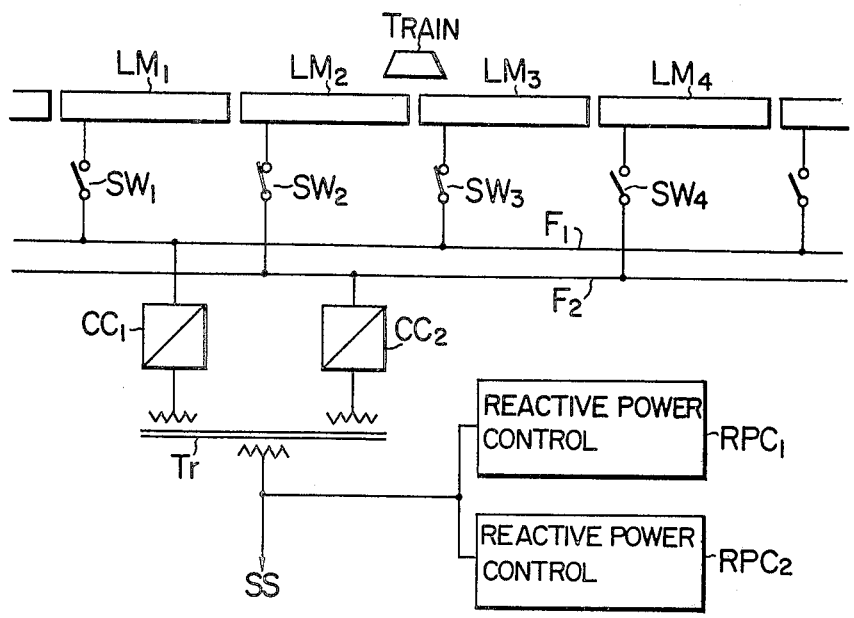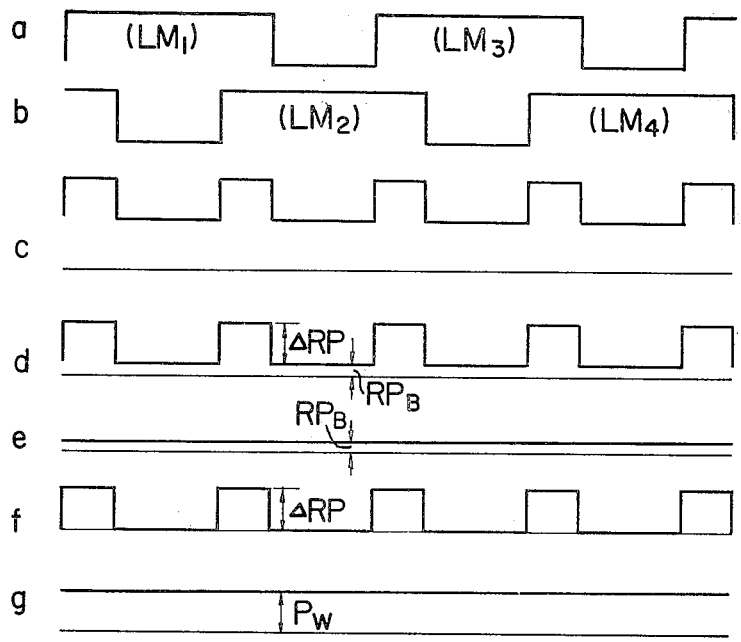

POWER SUPPLY SYSTEM FOR LINEAR MOTOR

This invention relates to a power supply system for linear motors, and in particular to such a system capable of compensating for reactive power which varies as a running body travels.

There are two systems in the case where a running body is driven by a linear motor. In one system the armature coils (commonly called driving coils) of the linear motor are disposed along the track for the running body and alternatively in the other system they are mounted on the running body. It is usual, however, to dispose the driving coils along the track for the convenience of feeding power. In this case, a plurality of driving coils which have proper length are disposed along the track in respect of the power factor and the power supply capacity. These driving coils are respectively connected through switches associated thereto to a power converter device. The individual switches are actuated in accordance with the movement of the running body. The thus constructed power supply system may selectively feed only some of the driving coils located in the vicinity of the running body, and therefore it is more advantageous for the power factor and power supply capacity than a power supply system which feeds simultaneously all the driving coils throughout the track of the running body.

A particular example of a power supply system of this kind is disclosed, for example, in U.S. Pat. No. 4,068,152.

Any electrical equipment involves reactive power. Since a low level of reactive power is of course more desirable, there are some pieces of electrical equipment in which the reactive power may be compensated for, as described, for example, in Japanese Patent Application Laid-Open (Kokai) No. Sho 51-33850. That is, such a reactive-power compensation system is known in which the compensation quantity is adjusted in accordance with the power factor of a load.

Also in a power supply system for linear motors the compensation for reactive power is required. In the case of a linear motor, however, such a reactive-power compensation system as previously described in connection with general electrical equipment cannot be utilized as it is, because the movement of the running body must be taken into consideration.

From the view point mentioned above, it has been desired to provide such a power supply system for a linear motor which is capable of compensating for the reactive power peculiar to linear motors.

It is therefore an object of the invention to provide a power supply system for a linear motor which is capable of compensating for reactive power.

According to the present invention, there is provided a power supply system which comprises a reactive-power controller for controlling the compensation quantity in accordance with the movement of a running body so as to compensate for the reactive power which varies in accordance with the movement of the running body.

The foregoing object and other objects as well as the characteristic features of the invention will become more apparent and more readily understandable by the following description and the appended claims when read in conjunction with the accompanying drawings in which:

FIG. 1 shows a schematic diagram of an embodiment of a power supply system for a linear motor according to the present invention;

FIG. 2 shows waveforms illustrating the operation of the system shown in FIG. 1;

Figure 3:
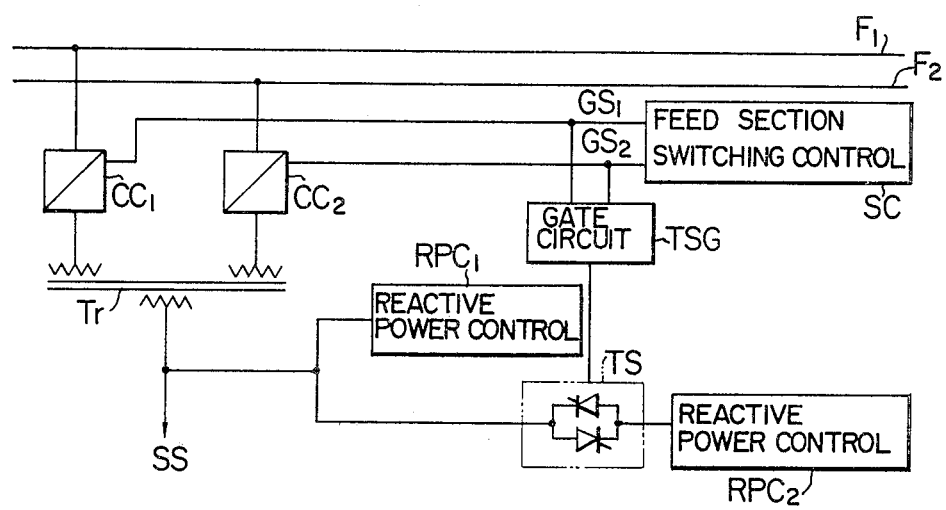
FIG. 3 shows a circuit diagram illustrating the control for a second reactive power controller.

In FIG. 1 showing a schematic diagram of an embodiment of a power supply for a linear motor according to the present invention, linear motor driving coils $LM_1$, $LM_2$, $LM_3$, $LM_4$ . . . are alternately connected to a feeder $F_1$ and a feeder $F_2$ through switches $SW_1$, $SW_2$, $SW_3$, $SW_4$. . . , respectively. Power converters $CC_1$ and $CC_2$ are connected to the feeders $F_1$ and $F_2$, respectively, and a first and a second reactive power controller $RPC_1$ and $RPC_2$ are connected to the primary winding of a transformer Tr which is in turn connected to an a.c. source SS.

The operation of this power supply system will now be described. When a running body labelled TRAIN is located over both of the two adjacent driving coils $LM_2$ and $LM_3$ as shown in FIG. 1, both the switches $SW_2$ and $SW_3$ associated respectively to these coils $LM_2$ and $LM_3$ are closed to allow the power converters $CC_1$ and $CC_2$ to feed these two driving coils $LM_2$ and $LM_3$ respectively. When the running body comes only above the driving coil $LM_3$ after having left the driving coil $LM_2$ the power converter $CC_2$ is disconnected and only the power converter $CC_1$ continues to feed the driving coil $LM_3$ until the moment immediately before the running body reaches the driving coil $LM_4$.

FIG. 2 shows waveforms in this operation. In FIG. 2, a and b represent the power supplied by the power converters $CC_1$ and $CC_2$, respectively. The labels "$LM_1$" and "$LM_3$" in a respectively indicate that the driving coils $LM_1$ and $LM_3$ are fed by the power converter $CC_1$ and the labels "$LM_2$" and "$LM_4$" in b respectively indicate that the driving coil $LM_2$ and $LM_4$ are fed by the power converter $CC_2$. During the period in which the running body is passing over two adjacent driving coils, both the power converters $CC_1$ and $CC_2$ supply power simultaneously. According to this feeding method, the running body may travel through its entire track with a constant driving force. However, the resultant power of the power converters $CC_1$ and $CC_2$, i.e. the apparent power on the primary side of the transformer Tr, is greatly varied as shown in the waveform c of FIG. 2, thereby causing an adverse effect om the a.c. input source SS unless proper measures are taken. The variations in the apparent powr are attributed mostly to the variations in the reactive power caused by the simultaneous exitation of two driving coils. As shown in the waveform d of FIG. 2, the reactive power is considered to include two portions; one portion $RP_B$ being a basic portion determined by the power factor or the like of the linear motor and the other portion $\Delta RP$ being an increment caused by the simultaneous exitation of two driving coils. If the basic reactive power $RP_B$ as shown in the waveform e of FIG. 2 may be compensated for by the first reactive power controller $RPC_1$ and described above and the reactive power increment ΔRP caused by the simultaneous exitation of two driving coils as shown in the waveform f of FIG. 2 may be compensated for by the second reactive power controller described above, the a.c. input power source may be designed to supply effective power Pw which is substantially constant as shown in the waveform g of FIG. 2.

Each of the reactive power controllers may be of the conventional type comprising capacitors and reactors. As shown in FIG. 3, the second reactive power controller $RPC_2$ achieves its control operation in conjunction with feeding commands $GS_1$ and $GS_2$ produced by a feeder-section switching control device SC for controlling the operations of the switches and the power converters. More specifically, when both the respective feeding commands $GS_1$ and $GS_2$ to the power converters $CC_1$ and $CC_2$ indicate the actuation of the power converters, a gate circuit TSG actuates a thyristor switch TS to turn it on so as to connect the second reactive power controller $RPC_2$ to the a.c. power line. Thus, the variations in reactive power which are caused while the running body is passing over two adjacent driving coils may be compensated for.

Figure 4:
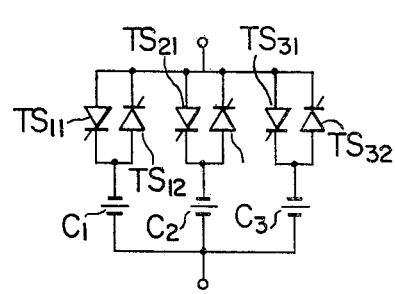
FIG. 4 shows an example of an electric circuit diagram of a reactive power controller.

In the case where the second reactive power controller is of a thyristor controlled type as shown in FIG. 4, the thyristor switch TS of FIG. 3 may be omitted. In this reactive power controller of FIG. 3, thyristors $TS_{11}$ to $TS_{32}$ are turned on when the command from the gate circuit TSG is on, while turned off when the command from the gate circuit TSG is off. $C_1$ to $C_3$ in FIG. 4 designate parallel capacitors. In the case of the reactive power controller of the thyristor controlled type, the compensation for reactive power may be made more finely if reactive power is controlled every moment in accordance with a predetermined reference value which is provided as a command corresponding to the variations in reactive power while the running body is passing over two adjacent driving coils.

Figure 5:
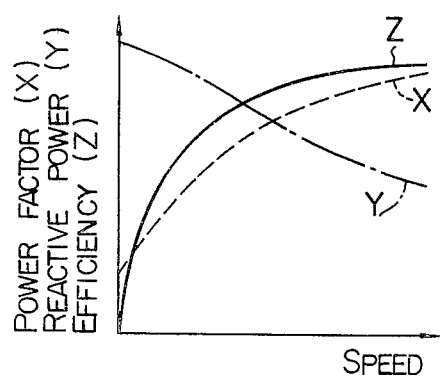
FIG. 5 shows characteristics of a linear motor.
Figure 6:
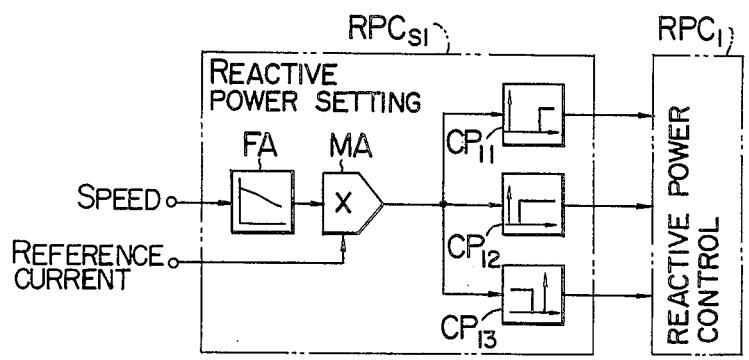
FIGS. 6 and 7 show block diagrams of a reactive power setting device and a reactive power controller, respectively, in the case where the reactive power controller is controlled in accordance with the operating condition of the linear motor.
Figure 7:
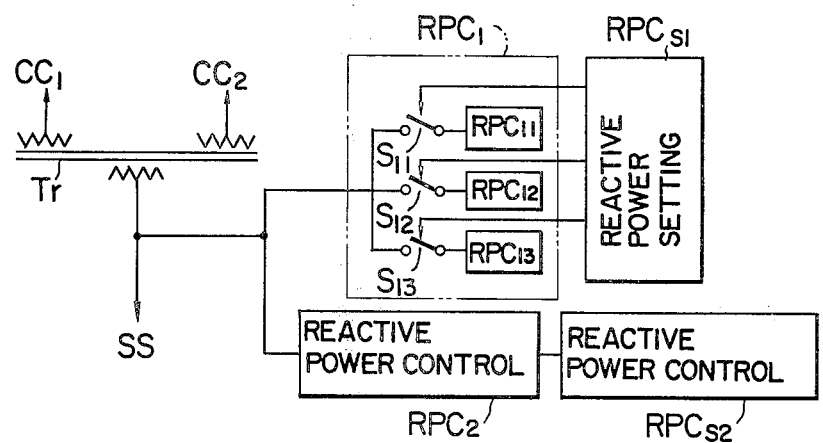

The first reactive power controller $RPC_1$ is provided to compensate for the basic or steady portion of the reactive power as described previously. In the case where the linear motor is a linear synchronous motor, its characteristics, such as power factor (curve X), reactive power (curve Y) and efficiency (curve Z), vary with the motor speed as shown in FIG. 5. Commonly, since a linear synchronous motor is driven by a constant current in accordance with a current reference, the reactive power varies with the magnitude of the reference current flowing through driving coils. For example, in acceleration a relatively large current is required, while in constant speed running a current is required less than that corresponding to the driving force against the resistance to the movement of the running body. In the case of a linear motor, the reactive power to be compensated for thus depends on the operation conditions such as motor speed and current. FIGS. 6 and 7 show arrangements to be used to compensate for the variations in this basic portion of reactive power by means of the first reactive power controller.

In FIG. 6, a reactive power setting device $RPC_{s1}$ receives signals representative of operating conditions of the linear motor, such as the motor speed and current, and sets the reactive power to be compensated for by the first reactive power controller. The reactive power compensation may most desirably be performed continuously in accordance with the operating conditions of the linear motor, but such an arrangement of the reactive power controllers will be complicated and expensive. As a second best alternative, the reactive power compensation is performed stepwise by dividing the operation conditions in accordance with which the compensation is effected into three steps in the reactive-power setting device $RPC_{s1}$ of FIG. 6 and the first reactive power controller $RPC_1$ of FIG. 7. In FIG 7, a maximum powering controller unit $RPC_{11}$, a powering controller unit $RPC_{12}$, and a regenerative braking controller unit $RPC_{13}$ are provided and they are selectively alternatively connected through switches $S_{11}$, $S_{12}$ and $S_{13}$ respectively to the a.c. source so as to compensate for reactive power in a stepwise manner. This enables the system to be constructed simply and inexpensively. The alternative selection of the reactive power controller units $RPC_{11}$ to $RPC_{13}$ may be made for example, in such a manner as shown in FIG. 6 in which the output of a function generator FA representative of reactive power characteristics with respect of the motor speed is multiplied by a reference current value by a multiplier MA and the resultant is used by comparators $CP_{11}$ to $CP_{13}$ to determine which unit is to be selected. The comparators $CP_{11}$, $CP_{12}$ and $CP_{13}$ correspond to the maximum powering, normal powering, and regenerative braking running conditions. The setting value of the comparator $CP_{12}$ occupies a positive region, the setting value of the comparator $CP_{11}$ also occupies a positive region which is, however, larger than that of the comparator $CP_{12}$ and the setting value of the comparator occupies a negative value. When the output signal of the multiplier MA falls within any one of the setting value regions of the comparators $CP_{11}$, $CP_{12}$ and $CP_{13}$, the comparator produces an output to actuate one of the switches $S_{11}$ to $S_{13}$ associated to the comparator to make the contact thereof. When the output from the multiplier MA is relatively small, the reactive power to be compensated for is small and thus the switches $S_{11}$ to $S_{13}$ are opened to disconnect the reactive power controller from the system. In order to perform the reactive power compensation more finely, the reactive power setting device $RPC_{s1}$ and the first reactive power controller $RPC_1$ shown in FIGS. 6 and 7 may be divided into more units.

The above-described method of changing the reactive power to be compensated for in accordance with the operating conditions is also effective in the second reactive power controller. For example, when the reference current value is small, the variations in reactive power are small and thus the quantity to be compensated for should be small, otherwise an overcompensation will occur. If a reactive power controller of an advanced power factor is connected to a load of a lagging power factor in powering, the power source line is considered to be connected to a load of an excessively advanced power factor, resulting in adverse effects such as an increase in voltage. Taking into consideration the fact mentioned above, in the embodiment shown in FIG. 7, the quantity of the reactive power to be compensated for by the second reactive power controller $RPC_2$ may also be varied in accordance with the operating conditions by the reactive power setting device $RPC_{s2}$ in the same manner as that effected by the first reactive power setting device $RPC_{s1}$ and the first reactive power controller $RPC_1$.

Although in the system of the above-described embodiments two power converters and two feeders are utilized to feed adjacent driving coils by different power converters, the present invention is not limited to this system. An alternative system may be embodied in which a single power converter is used and the feeding the driving coils is controlled merely by switches. Alternatively, three or more power converters may also be used.

The present invention provides a power supply system for a linear motor capable of compensating for the reactive power occurring in the case where a plurality of driving coils are sequentially fed with electrical energy in accordance with the movement of a running body, i.e. the reactive power varying with the movement of the running body, while preventing adverse effects from occurring on the associated a.c. power source line.

What we claim is:

1. A power supply system for a long-stator linear motor, the stationary long stator of which comprises a plurality of sections arranged along a path, said sections each being connectable to a converter means in accordance with the position of a vehicle moved relative to said sections along said path, said converter means providing a frequency-controllable polyphase output to each section when a movable portion of the linear motor fixed to the vehicle is disposed in the region of each such section to move said vehicle along said path, wherein at the input side of said converter means there are provided, first and second reactive power compensation means which are connected in parallel to one another, the capacitance of each of said first and second reactive power compensation means being controlled in accordance with a signal corresponding to a value of reactive power required for feeding said stationary long stator to move said vehicle, said first reactive power compensation means being constantly turned on, said second reactive power compensation means being capable of being turned on in accordance with the movement of the vehicle when two long-stator sections are turned on simultaneously.

2. A power supply system according to claim 1, wherein the signal corresponding to the value of the reactive power is generated in response to both the generation of the linear motor current and the speed of the vehicle.

* * * * *